(No Model.)
F. S. PEARSON.
CONDUIT FOR RAILROADS.
No. 603,656. Patented May 10, 1898.
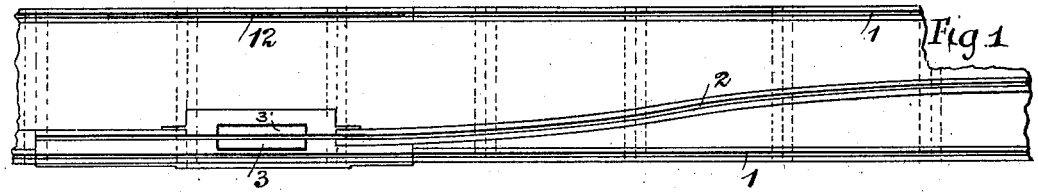
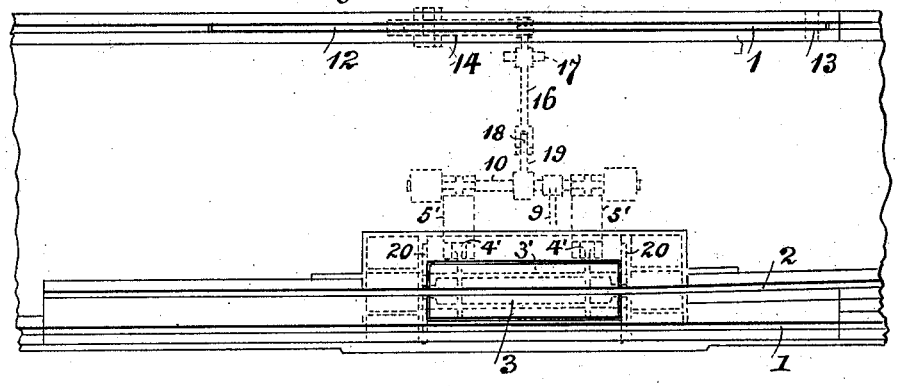
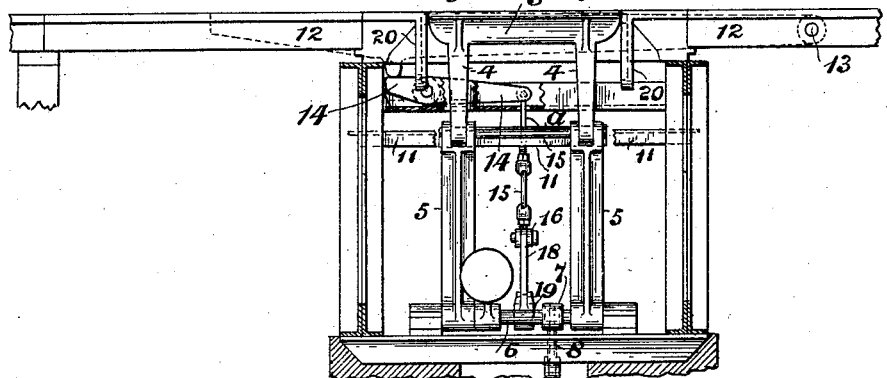
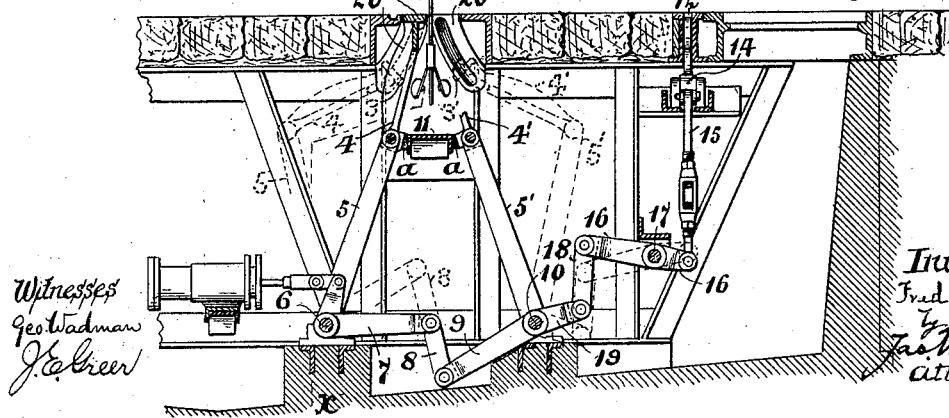

UNITED STATES PATENT OFFICE.

FRED S. PEARSON, OF BOSTON, MASSACHUSETTS.

CONDUIT FOR RAILROADS.

SPECIFICATION forming part of Letters Patent No. 603,656, dated May 10, 1898.

Application filed September 14, 1897. Serial No. 651,584. (No model.)

*To all whom it may concern:*

Be it known that I, FRED S. PEARSON, a citizen of the United States, and a resident of Boston, in the county of Suffolk and State of Massachusetts, have invented certain new and useful Improvements in Conduits for Railroads, of which the following is a specification.

My improvement relates particularly to what are called "underground" electric railroads or those electric railroads in which the electric conductors are placed in subways or conduits beneath the surface of the road and the electricity conveyed to the motors by plows or collectors depending from the bottom of the cars. It is sometimes necessary to lift these collectors or plows from the conduits while the car is on the track—as, for instance, when the car is run on a section of the track in which there is no conduit or subway; and my improvement consists in a trap or door on the top of the conduit which is automatically opened by the passage of the car over the track and through which the plow or collector is lifted from the conduit onto the car.

In the accompanying drawings, illustrating my improvement, Figure 1 is a plan view of the track, showing the position of the trap or door. Fig. 2 is an enlarged plan view of the track, showing the trap and, in dotted lines, the mechanism for operating the same. Fig. 3 is a side elevation of the trap and mechanism for operating the same through the line $x\ x$, Fig. 4; and Fig. 4 is an end elevation, partly in section, through the line $y\ y$, Fig. 3.

1 1 are the rails on which the cars run, and 2 is the slot-rail through which the electric plow projects into the conduit.

3 is the trap or door into the conduit. As will be seen from Figs. 1 and 2, this door is situated at the side of the road next to one of the rails in order that when the plow is raised into the car it will be under the seat of the latter, and the slot-rail 2 is deflected from the center of the road sidewise, and thus made to carry the plow in position under the trap. As shown, the trap or door is in two parts or sections, having the opening or slot between them. These sections are held in place and automatically raised and lowered by the mechanism shown in Figs. 3 and 4, and erected in the conduit beneath the trap. On the under side of each section 3 of the trap are two arms 4 4', the lower ends of which are pivoted in the upper ends of the levers 5 5', mounted on the rock-shafts 6 and 10, respectively. On the shaft 6 is a short arm or lever 7, the outer end of which is connected by a link 8 with a lever 9, secured to and turning with the rock-shaft 10. The rock-shafts 6 and 10, and consequently the levers 5 and 5', secured to the two sections of the trap, are thus connected with each other, insuring the two parts of the trap moving together when the trap is opened or closed. When the trap is closed, the levers 5 and 5' occupy the position shown in Fig. 4, with their upper ends, to which the rods 4 and 4' are connected, resting against the crosspiece 11. The shafts 6 and 10 are revolved and the levers 5 and 5' thrown back or outward by mechanism operated by the wheel of the car as it passes over the track.

Alongside of the track, opposite the trap, is a tongue 12, pivoted at one end 13 and placed in such a position that it will be depressed by the wheel of the car. Immediately below this tongue and moving in the same vertical plane is a lever 14, pivoted near one end to the framework and having its shorter arm in contact with the under side of the tongue 12. To the other or longer arm is connected a rod 15, the lower end of which is secured to one end of the lever 16, turning on the shaft 17. The opposite end of the lever 16 is connected by a link 18 with an arm 19, mounted on the rock-shaft 10.

As will be understood by reference to Figs. 3 and 4, as the tongue 12 is depressed by the car-wheels it operates the lever 14, with one end of which it is in contact, and the latter through the rod 15 operates the lever 16 and pushes down the lever 19, mounted on the rock-shaft 10, and thus turns the latter shaft so as to throw outward or back the lever 5'. As the two rock-shafts 6 and 10 are connected with each other by the levers 7 and 9 and link 8, as the rock-shaft 10 is revolved it revolves the other shaft in the opposite direction, and thus the levers 5 and 5', connected with both sections of the trap 3, are thrown back or outward at the same time. As these levers move outward they draw the sections of the trap down and back by means of the rods 4 and 4', to which they are connected, and thus open the trap. The position of the several parts when the trap is thus drawn down or opened is indicated by dotted lines in Fig. 4. On the frame, at each end of the trap, are curved pieces 20, in which projections on the ends of the trap slide and by means of which the sections of the trap are guided and held steady as they are drawn down or pushed up when the trap is opened or closed. When the pressure of the car-wheel is removed from the tongue 12, the latter rises and relieves the pressure on the lever 14. The mechanism is so constructed and arranged that it at once returns to its original position as soon as the downward pressure is removed from the short arm of the lever 14, thus sliding the sections of the trap up and closing the same.

To prevent the slamming and jarring of the apparatus when the trap is opened, the piston 21 of the dash-pot 22 is connected with an arm 23, secured on the rock-shaft 6, and so arranged as to drive the piston inward when the shaft is turned in, throwing back the levers and opening the trap.

The operation of the mechanism is as follows: As the car passes along to the place where it is desired to withdraw the electrical plow or collector from the conduit the plow is guided to the side of the track by the slot-rails until it is directly beneath the trap. Before the plow has reached this position the forward wheels of the car have passed over the tongue 12, pressing it down on the lever 14, and thus operating the mechanism by which the sections of the trap are drawn down and the trap opened, the location of the tongue 12 being such that the trap is fully opened at the moment the plow or collector has arrived in position under it. The plow is then raised from the conduit and placed on the car and the latter propelled along the track. As the car passes beyond the tongue the trap mechanism returns to its original position and the trap is closed. The trap is thus automatically opened by the car and closes at once as soon as the car has passed beyond it. As will be understood from Fig. 4, the position of the levers 5 and 5' is such that they act as braces in holding up the sections of the trap, and the latter cannot be pressed down and opened by any pressure on the top of the trap, as by anything stepping on or passing over the same, it being impossible to open the trap except by means of the trap mechanism operated by the tongue placed alongside of the rail.

While this improvement is especially adapted to underground electric railroads, it is equally well adapted to all roads having conduits and apparatus depending therein from the car, as to ordinary cable-roads, where it is desired to remove the cable-grip from the conduits.

What I claim is—

1. In a conduit for railroads, in combination, a trap in the top of the conduit; mechanism by which the trap is opened and closed; and an actuator arranged to be depressed by the car-wheel, whereby the trap mechanism is operated, substantially as described.

2. In a conduit for railroads, in combination, the trap 3 in the top of the conduit; levers 5 by which the trap is held in place and raised and lowered; mechanism whereby the levers are actuated in opening and closing the trap; and an actuator 12, arranged and adapted to be depressed by the car-wheel and to operate the mechanism for actuating the levers, substantially as described.

Signed at New York city, in the county of New York and State of New York, this 3d day of August, A. D. 1897.

FRED S. PEARSON.

Witnesses:
S. A. EMANUEL,
W. P. PLUMMER.